(12) United States Patent
Truong

(10) Patent No.: US 7,784,632 B2
(45) Date of Patent: Aug. 31, 2010

(54) COLLAPSIBLE CARGO ORGANIZER

(76) Inventor: Thai Vo Truong, 8812 Wooley La., Garden Grove, CA (US) 92841

( * ) Notice: Subject to any disclaimer, the term of this patent is extended or adjusted under 35 U.S.C. 154(b) by 883 days.

(21) Appl. No.: 11/381,393

(22) Filed: May 3, 2006

(65) Prior Publication Data

US 2007/0095826 A1 May 3, 2007

Related U.S. Application Data

(60) Provisional application No. 60/730,480, filed on Oct. 27, 2005.

(51) Int. Cl.
*B65D 6/18* (2006.01)
*B65D 8/14* (2006.01)
(52) U.S. Cl. .............................. 220/7; 220/6
(58) Field of Classification Search ............ 220/7, 220/6, 4.34, 4.33, 4.29, 4.28, 4.24, 4.22, 220/551, 529, 530, 531, 532, 534, 535, 549, 220/772, 23.86, 720, 1.6, 1.5, 500, 23.83, 220/4.01; 224/539, 42.34; 190/107, 110, 190/109, 115, 1; *A45C 3/02, 5/12; B42F 7/08*
See application file for complete search history.

(56) References Cited

U.S. PATENT DOCUMENTS

| | | | | |
|---|---|---|---|---|
| 110,991 | A * | 1/1871 | Miller | 206/541 |
| 513,726 | A * | 1/1894 | Potts | 217/8 |
| 732,983 | A * | 7/1903 | Whitney | 190/110 |
| 1,318,007 | A * | 10/1919 | Gau | 312/244 |
| 1,369,704 | A * | 2/1921 | Parker | 220/7 |
| 2,674,288 | A * | 4/1954 | Laidlaw | 190/115 |
| 3,310,905 | A * | 3/1967 | Davis et al. | 43/57.1 |
| 4,319,683 | A * | 3/1982 | Correa, III | 206/349 |
| 4,561,705 | A * | 12/1985 | Schafer | 312/244 |
| 5,076,460 | A * | 12/1991 | Hussell | 220/4.22 |
| 5,323,921 | A * | 6/1994 | Olsson | 217/12 R |
| 5,328,042 | A * | 7/1994 | Heise | 220/7 |
| 5,501,384 | A * | 3/1996 | Wisniewski | 224/539 |
| 5,584,412 | A * | 12/1996 | Wang | 220/500 |
| 5,622,276 | A * | 4/1997 | Simmons | 220/6 |
| 5,782,371 | A * | 7/1998 | Baerenwald et al. | 220/4.22 |
| 5,956,968 | A * | 9/1999 | Grabowski | 62/457.2 |

(Continued)

FOREIGN PATENT DOCUMENTS

DE      3621044 A1 *  1/1987

(Continued)

*Primary Examiner*—Anthony Stashick
*Assistant Examiner*—Robert J Hicks

(57) ABSTRACT

An organizer for holding and organizing cargo comprises a case and a collapsible wall. A case comprises a pair of hinged case halves. The case is adapted to contain a collapsible wall that comprises two end walls and two side walls. Each side wall can include two side wall panels that can be pivotally joined together. The collapsible wall is configurable into a generally square-in-plan-view open configuration, or a generally flat, collapsed configuration. The case and the collapsible wall form an open-ended bin for holding the cargo. One or more extensible poles can be used to assist in restraining the cargo. The collapsible wall can be set to the collapsed configuration and stored in the case along with the extensible pole(s). The case can then be placed in the closed position, whereupon the organizer is completely contained within the closed case, facilitating storage and transport thereof.

19 Claims, 4 Drawing Sheets

U.S. PATENT DOCUMENTS

| | | | |
|---|---|---|---|
| 6,036,041 A * | 3/2000 | Chern | 220/6 |
| 6,170,689 B1 * | 1/2001 | Flesher et al. | 220/7 |
| 6,386,365 B1 | 5/2002 | Tan | |
| 6,623,059 B2 | 9/2003 | Gehring et al. | |
| 6,938,807 B2 | 9/2005 | Victor | |
| 2002/0053575 A1 * | 5/2002 | Oliver | 220/835 |
| 2002/0162842 A1 * | 11/2002 | Pangerc et al. | 220/524 |
| 2003/0062233 A1 | 4/2003 | Sharples | |
| 2006/0118555 A1 * | 6/2006 | Pangerc et al. | 220/23.83 |

FOREIGN PATENT DOCUMENTS

EP    375925 A2 *  7/1990

* cited by examiner

COLLAPSIBLE CARGO ORGANIZER

CROSS-REFERENCE TO RELATED APPLICATIONS

This application claims the benefit of U.S. Provisional Patent Application 60/730,480, filed on Oct. 27, 2005.

STATEMENT REGARDING FEDERALLY SPONSORED RESEARCH AND DEVELOPMENT

Not Applicable.

FIELD OF THE INVENTION

This invention relates to vehicle cargo organizers, and more particularly to a collapsible vehicle cargo organizer.

DISCUSSION OF RELATED ART

When transporting cargo, such as groceries, sporting equipment, or the like in a vehicle, cargo holders and organizers can keep such items from tipping over and generally keep the cargo from rolling around during transit or otherwise becoming unorganized. Some vehicles include built-in organizers. However, for vehicles without a built-in organizer, there is a need for an easily set-up and used cargo organizer.

In its simplest form, a standard crate may be used as a cargo organizer. However, a non-collapsible crate is difficult to store since it does not collapse into a convenient configuration. Further, standard crates, such as milk crates for example, are not easily configured to accommodate cargo of varying sizes as the need arises.

Yet, even collapsible crates, such as that taught in U.S. Pat. No. 6,386,365 to Tan on May 14, 2002, are not necessarily easy to transport and store in their collapsed configurations. Such a collapsible crate device makes no provision for easily carrying the device when collapsed. Further, such a device also has the drawback that it does not accommodate or adapt to cargo of varying sizes.

Other collapsible cargo organizers, such as those taught in U.S. Pat. No. 6,623,059 to Gehring et al. on Sep. 23, 2003; US Patent Application 2003/0062233 to Sharples on Apr. 3, 2003; and U.S. Pat. No. 6,938,807 to Victor on Sep. 6, 2005; have similar drawbacks. For example, no provision is made to easily retain cargo items of varying sizes in such items. Further, such devices do not collapse down into an extremely compact case that is easy to transport. Still further, such devices are not well designed for stability in a moving vehicle, for example.

Clearly, then, there is a need for an cargo organizer that is extremely easy to set-up and knock-down. Such a needed device would allow the user to transport securely cargo items of varying sizes, and would be stable within a moving vehicle. Further, such a needed device would provide for easy transport and storage in a collapsed configuration, and would be relatively inexpensive to manufacture. The present invention accomplishes these objectives.

SUMMARY OF THE INVENTION

The present device is an organizer for holding and organizing cargo, such as grocery bags, store-bought products, swimming accessories, automotive accessories, or the like. The case comprises a pair of case halves, each of which includes a bottom wall that has a plurality of upwardly extending side edges at a periphery thereof. One side edge of each half includes a mutually-cooperating hinge means. One opposite side edge of each half includes a mutually cooperating latch means. When fully opened, wherein one case half is rotated about the hinge means substantially 180 degrees, the case assumes an open position.

The organizer further includes a collapsible wall extension means that comprises two end walls and two side walls. Each wall includes an upper edge, a lower edge, an inside surface, and an outside surface. Each side wall includes two side wall panels that are pivotally joined together at a side wall panel hinge means. The collapsible wall extension means is configurable into a generally square-in-plan-view open configuration, or a generally flat, collapsed configuration.

Each half of the case preferably includes a pair of snap apertures traversing the side edges thereof proximate the hinge means of the one side edge. Further, each side wall panel includes a snap aperture adjacent to its case hinge cut-out such that when the wall extension means is in the open configuration and engaged with the case, each snap aperture of each side wall panel is aligned with one of the apertures of one of the halves of the case. As such, a snap pin may be temporarily inserted through each aperture to retain each side wall panel to the case.

The organizer preferably further includes a pair of extensible poles sized to fit between and be frictionally, mechanically retained by either the two side walls or the two end walls of the wall extension means. As such, each pole may be engaged between snap pins of opposing side walls to strengthen the organizer when the case and the wall extension means are in their open positions.

The inside surface of each side wall preferably includes a plurality of pole receiving means, such as a plurality of raised, sinusoidal ridges projecting inwardly from the inner surface of each wall. Each pole receiving means may receive one end of one of the poles, and is associated with a corresponding pole receiving means on an opposing wall, such that with the pole engaged in each corresponding pole receiving means the pole is fixed in a substantially orthogonal orientation with respect to the one wall and the opposing wall. Further, each pole is fixed in a substantially parallel orientation with respect to the other walls and the bottom walls of each half of the case.

In use, with the wall extension means in the open configuration and positioned such that the lower edges of each wall thereof are in close proximity to the raised edges of each half of the case, and the case being in its open position, the organizer forms an open bin for holding the cargo. Conversely, with the wall extension means in the collapsed configuration and stored in the case, the case in the closed position, the organizer is completely contained within the closed case, facilitating storage and transport thereof.

The present device is a cargo organizer that is extremely easy to set-up and knock-down. The present invention allows the user to securely transport cargo items of varying sizes, and is stable within a moving vehicle. Further, the present device provides for easy transport and storage while in a collapsed configuration, and is relatively inexpensive to manufacture. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
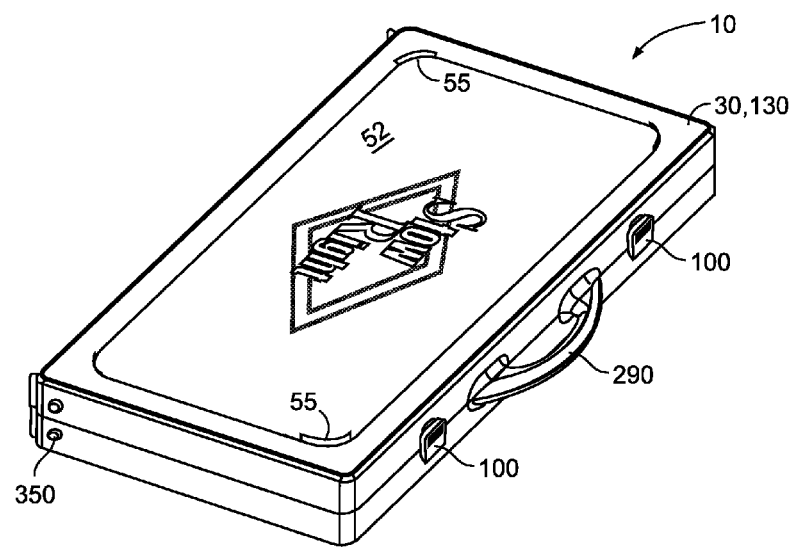
FIG. 1 is a perspective view of the invention, illustrating a case forming a substantially sealed enclosure in a closed position.
Figure 6:
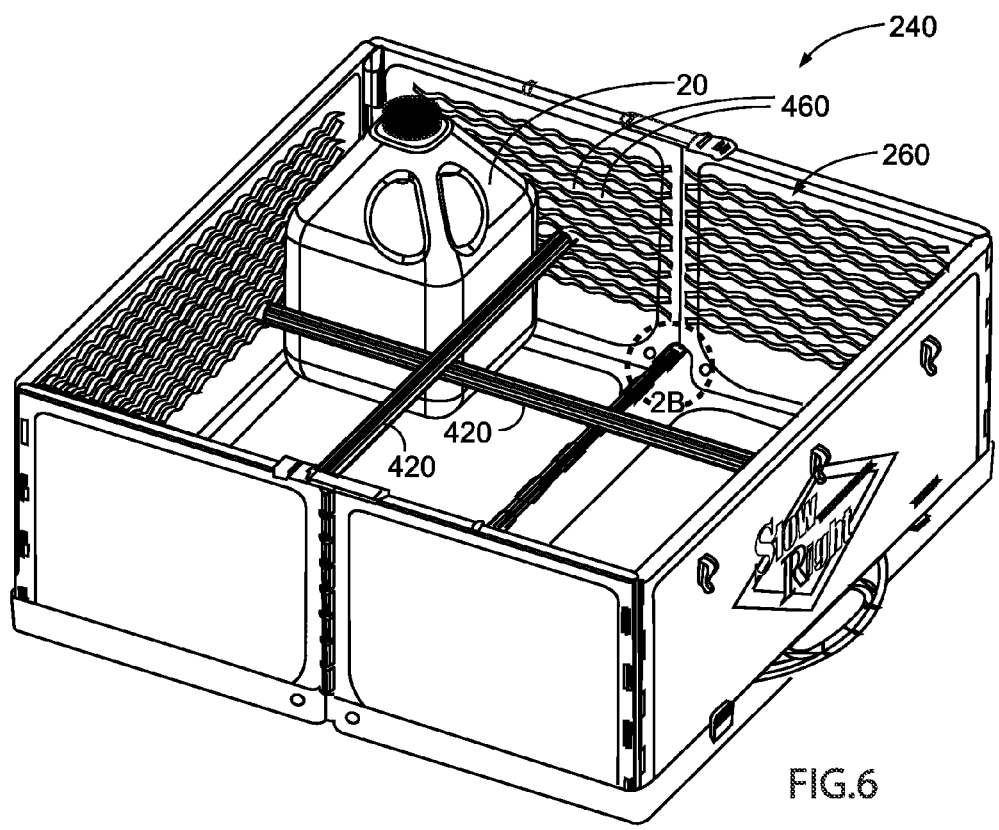
FIG. 6 is a perspective view of the invention, illustrating cargo as being retained thereby through the use of a pair of extensible poles.
Figure 7:
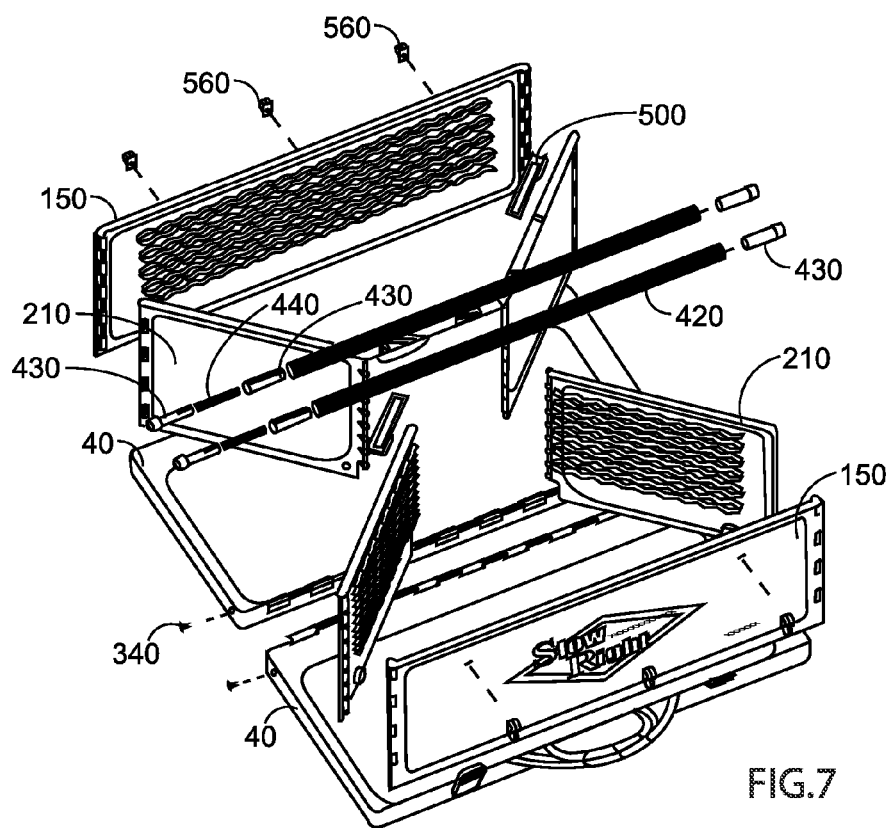
FIG. 7 is an exploded view of the invention.

FIGS. 1 and 6 illustrate an organizer 10 for holding and organizing cargo 20, such as grocery bags, store-bought products, swimming accessories, automotive accessories, or the like. The organizer 10 includes a case 30, best seen in FIG. 1, which shows the case 30 in a closed position 120 and forming a substantially sealed enclosure 130. The case 30 is preferably made from a rigid, molded plastic material.

Figure 2A:
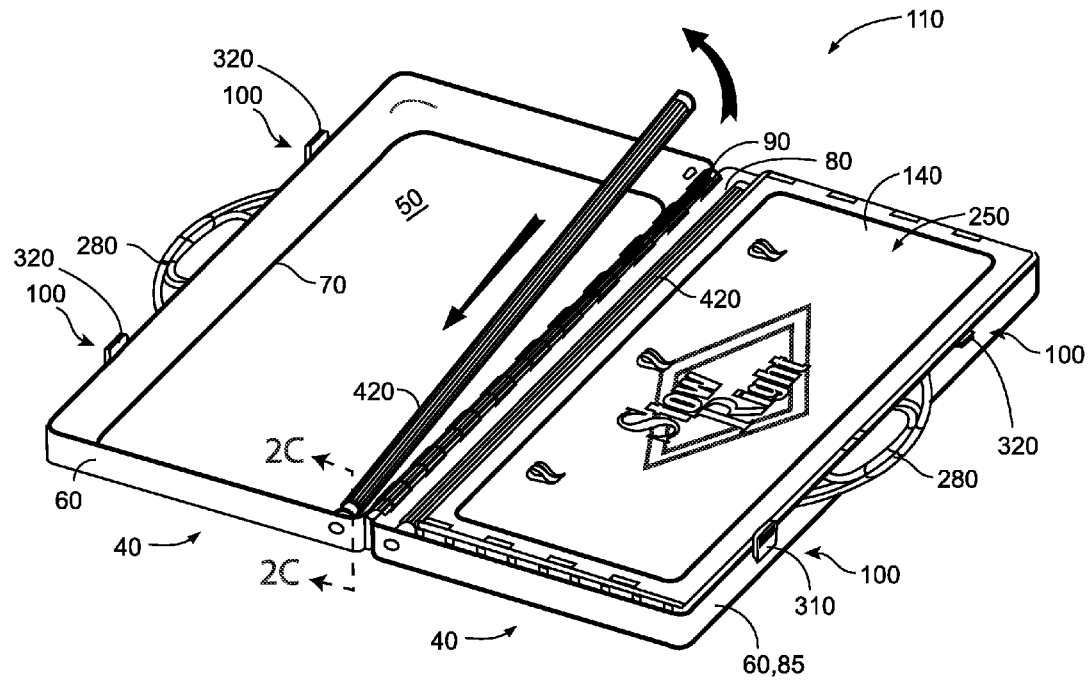
FIG. 2A is a perspective view of the invention, illustrating the case in an open position.
Figure 2B:
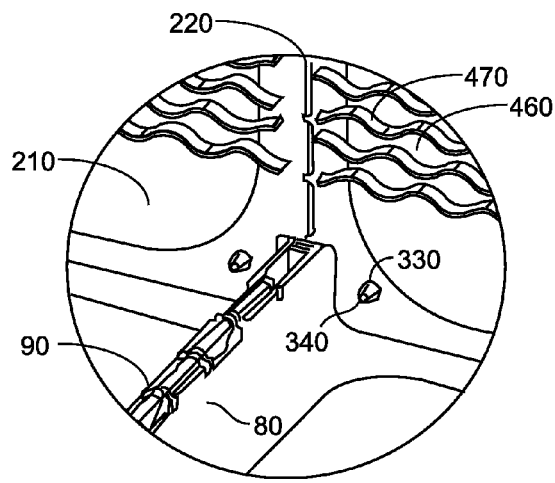
FIG. 2B is a partial perspective view of the invention, taken generally along lines 2B-2B of FIG. 6.
Figure 3:
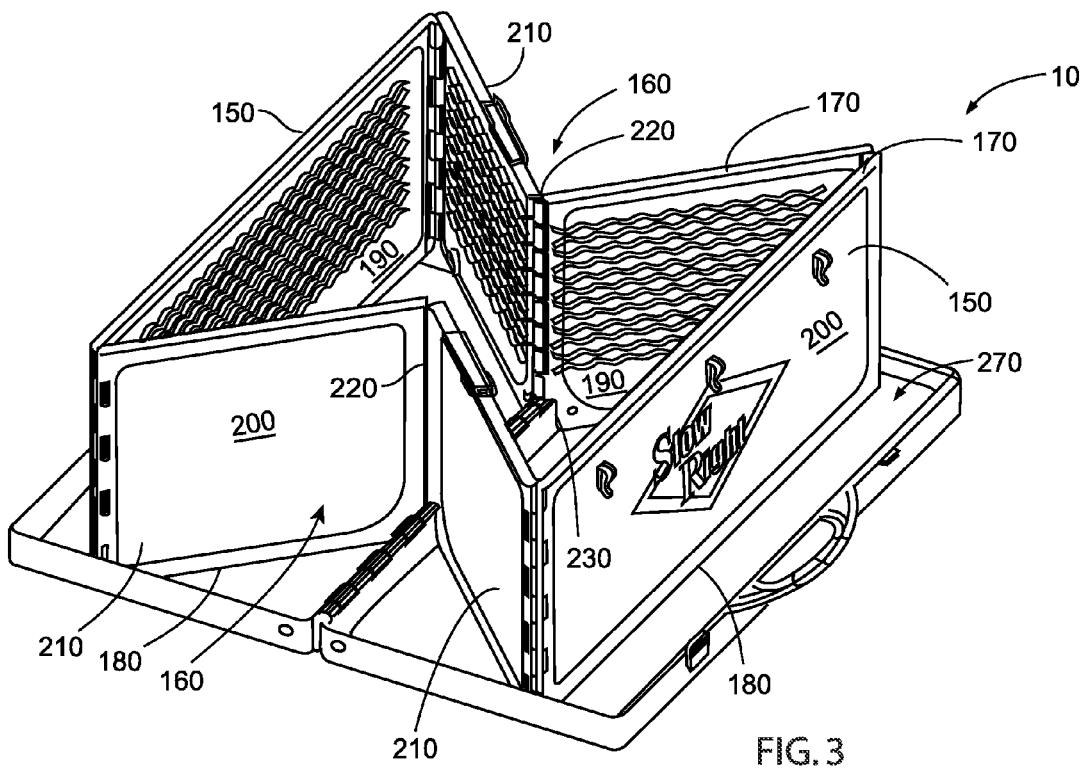
FIG. 3 is a perspective illustration of the invention illustrating a collapsible wall extension means being expanded into an open configuration.

The case 30 comprises a pair of case halves 40, each of which includes a bottom wall 50 that has a plurality of upwardly extending side edges 60 at a periphery thereof. One side edge 80 of each half 40 includes a mutually-cooperating hinge means 90 (FIGS. 2A and 2B). One opposite side edge 85 of each half 40 includes a mutually cooperating latch means 100, preferably comprising a lever 310 and a catch 320 (FIG. 2A), such that the catch 320 of one half 40 of the case 30 is frictionally retained by the lever 310 of the other half 40 of the case 30. As such, each lever 310 is manually actuable to release the corresponding catch 320 on the other half 40 to allow opening of the case 30. When fully opened, wherein one case half 40 is rotated about the hinge means 90 substantially 180 degrees, the case 30 assumes an open position 110 as illustrated in FIG. 1. The case 30 in the open position 110 forms a substantially water-tight tray 270 (FIG. 3). Further, stability ridges 55 protruding from an outside surface 52 of each bottom wall 50 serve to frictionally retain the case 30 on any carpeted or other surface (not shown) within a vehicle, helping to prevent the organizer 10 from tipping or sliding during transport.

Figure 4:
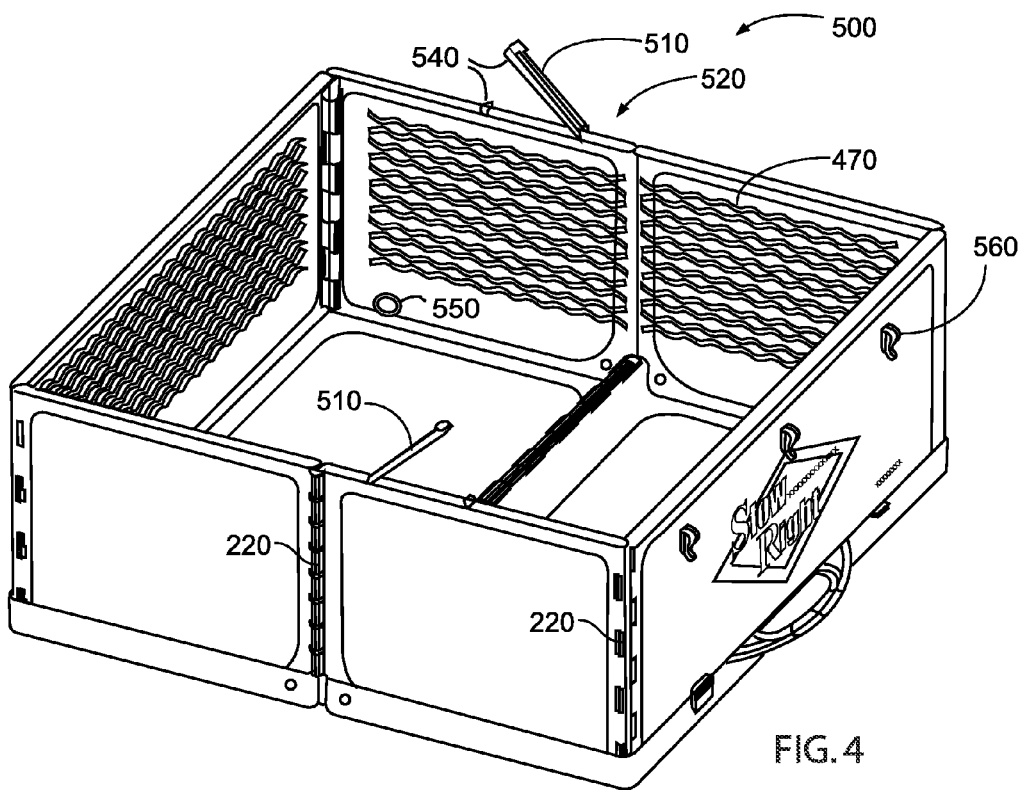
FIG. 4 is a perspective illustration of the invention illustrating the collapsible wall extension means in an open configuration.

The organizer 10 further includes a collapsible wall extension means 140, also preferably made from the same molded, rigid plastic material as is the case 30, that comprises two end walls 150 and two side walls 160. Each wall 150,160 includes an upper edge 170, a lower edge 180, an inside surface 190, and an outside surface 200. Each side wall 160 includes two side wall panels 210 that are pivotally joined together at a side wall panel hinge means 220 (FIGS. 2B and 3). Each side wall panel 210 further includes a case hinge cut-out 230 for receiving the hinge means 90 of each of the case halves 40 therethrough (FIG. 3). The collapsible wall extension means 140 is configurable into a generally square-in-plan-view open configuration 240, as illustrated in FIG. 6, and a generally flat, collapsed configuration 250 (FIG. 2A). Preferably each wall panel hinge means 220 is a set of interlocking cylindrical hinge elements, best seen in FIG. 4. A similar hinge means 220 pivotally retains each side wall panel 210 to one of the end walls 150 (FIG. 4).

Preferably each half 40 of the case 30 includes one half 280 of a handle 290 projecting from an outer surface 300 of the opposite side edges 85 thereof (FIG. 2A). Each half 280 of the handle 290 comes together to form the handle 290 when the case 30 is in the closed position 120, as illustrated in FIG. 1. Indeed, each half 40 of the case 30 is preferably made to be identical, molded from the same mold, such that two such halves 40 may be rotated 180 degrees with respect to each other and snapped together at their cooperating hinge means 90, which is preferably a series of interlocking cylindrical hinge elements best illustrated in FIG. 2B. If desired, a relatively long pivot pin may be included (not shown), traversing along the longitudinal axis of each cylindrical hinge element to pivotally fix the case halves 40 together.

Figure 2C:
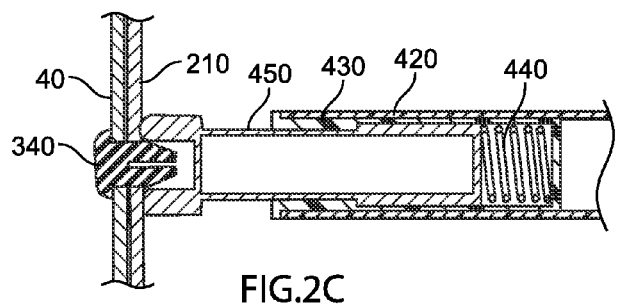
FIG. 2C is an exploded cross-sectional view of the invention, taken generally along lines 2C-2C of FIG. 2A.

Each half 40 of the case 30 also preferably includes a pair of snap apertures 330 traversing the side edges 60 thereof proximate the hinge means 90 of the one side edge 80 (FIG. 2C). A pair of snap pins 340 are included with each half 40 of the case 30. Each snap pin 340 includes a flat rim 350, larger in diameter than each snap aperture 330 and attached to one end 365 of a shaft 360. The shaft 360 is smaller in diameter than each aperture 330 such that the snap pin 340 may traverse each snap aperture 330. A conical snap portion 370 integral with an opposite end 380 of the shaft 360 is included, such that each snap pin 340 may be pressed through one aperture 330 from outside of the case half 40 and be retained by the rim 350 and the conical snap portion 370 thereof. As such, the conical snap portions 370 of each pin 340 project into the case 30 when the case 30 is in the closed position 120. The snap pins 340 are preferably made of resilient plastic or other suitably resilient material such that the conical snap portion 370 is able to temporarily deform inwardly towards the shaft 360 when the pin 340 is pressed through one of the apertures 330.

Further, each side wall panel 210 includes a snap aperture 390 adjacent to its case hinge cut-out 230 such that when the wall extension means 140 is in the open configuration 240 and engaged with the case 30, each snap aperture 390 of each side wall panel 210 is aligned with one of the apertures 330 of one of the halves 40 of the case 30, and as such may be snapped onto one snap pin 340 and retained thereby, temporarily but rigidly fixing the side wall panel 210 to the case 30 (FIG. 2B).

The organizer 10 preferably further includes a pair of extensible poles 420 each having two ends 430. Each pole 420 is sized to fit between and be frictionally, mechanically retained by either the two side walls 160 or the two end walls 150 of the wall extension means 140 (FIG. 6). At least one end 430 is biased away from the other end 430 by a spring means 440, which preferably includes a female insert 442 for inserting into the end 430 of the pole 420, a spring 444, and a male insert 445 (FIG. 2C). Each end 430 of the pole 420 includes an end aperture 450 for receiving and being by the conical snap portion 370 of each snap pin 340. As such, each pole 420 may be engaged between snap pins 340 of opposing side walls 160 to strengthen the organizer 10 when the case 30 and the wall extension means 140 are in their open positions 110, 240 (not shown), or within the case 30 when the case 30 is in its closed position 120 for convenient storage therein.

The inside surface 190 of each side wall 150,160 preferably includes a plurality of pole receiving means 460, such as a plurality of raised, sinusoidal ridges 470 projecting inwardly from the inner surface 190 of each wall 150,160.

Each pole receiving means 460 may receive one end 430 of one of the poles 420 (FIG. 6), and is associated with a corresponding pole receiving means 460 on an opposing wall 150,160, such that with the pole 420 engaged in each corresponding pole receiving means 460 the pole 420 is fixed in a substantially orthogonal orientation with respect to the one wall 150,160 and the opposing wall 150,160. Further, each pole 420 is fixed in a substantially parallel orientation with respect to the other walls 160,150 and the bottom walls 50 of each half 40 of the case 30. Each sinusoidal ridge 470 is in opposite phase with the adjacent sinusoidal ridges 470 to form the pole receiving means 460, and each sinusoidal ridge 470 cooperates with corresponding sinusoidal ridges 470 of an adjacent wall 150,160 such that when the wall extension means 140 is in the collapsed configuration 250, the ridges 470 intermesh with each other without making contact, thus facilitating placing the wall extension means 140 in its collapsed configuration 250. Preferably the ridges 470 are generally parallel with the upper and lower edges 170,180 of each wall 150,160.

Figure 8:
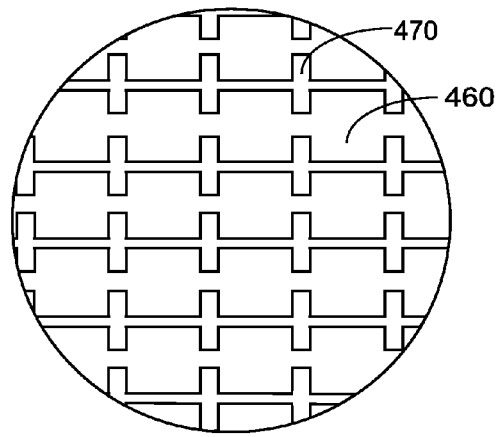
FIG. 8 is an elevational view of a side wall panel and an alternate pole receiving means.

Alternately, as illustrated in FIG. 8, the pole receiving means 460 is one portion of one of a plurality of raised, horizontal ridges 480 projecting inwardly from the inner surface 190 of each wall 150,160. Each horizontal ridge 480 further includes a plurality of equally-spaced short vertical ridges 490 intersecting the horizontal ridge 480 to form the pole receiving means 460. Each horizontal and vertical ridge 480,490 cooperates with corresponding ridges 480,490 of adjacent walls 160,150 such that when the wall extension means 140 is in the collapsed configuration 250 the ridges 480,490 intermesh with each other without making contact. Preferably the horizontal ridges are each generally parallel with the upper and lower edges 170,180 of each wall 150,160.

In an alternate embodiment of the invention, each pole 420 is made of a resilient material and can temporarily be flexed such that the pole 420 may be inserted into one of the pole receiving means 460 by flexing the pole 420 and then releasing same, whereby the pole 420 is then retained by the pole receiving means 460.

Figure 5A:
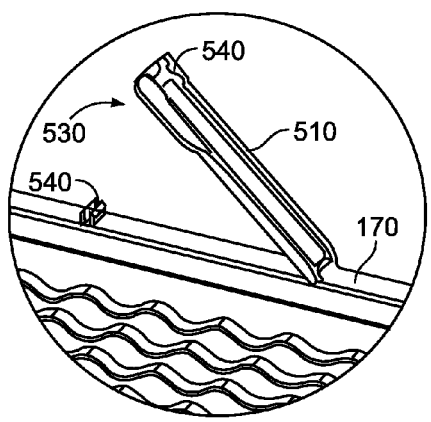
FIG. 5A is a close-up perspective view of a panel locking means in an unlocked position.
Figure 5B:
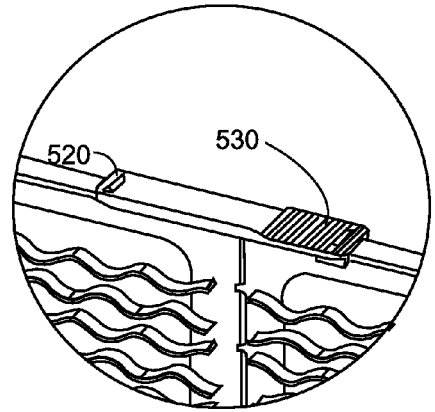
FIG. 5B is a close-up perspective view of a panel locking means in an locked position.

Each side wall panel 210 of each side wall 160 preferably further includes a panel locking means 500 for locking each side wall panel 210 in coplanar alignment (FIGS. 5A and 5B). The panel locking means 500 is preferably a manually actuable lever 510 adapted for pivotal attachment at one end 520 thereof and for selective frictional engagement wit the upper edge 170 of an adjacent side wall panel 210 at another end 530 thereof. Each lever further includes a snap means 540, such as the frictionally engaging notch and tab shown in FIGS. 5A and 5B. As such, the user may selectively move the lever 510 into either an unlocked position, shown in FIG. 3, or a locked position, shown in FIG. 5B.

Further, each side wall panel 210 further includes a pole retention means 550, such as a raised cylindrical wall as shown in FIG. 4 or a recessed portion (not shown), proximate to the lower edge 180 thereof. One of the poles 420 may be retained in the pole retention means 550 of two opposing side walls panels 210 for convenient storage of the pole 420 while the wall extension means 140 is in its open configuration 240. Each side wall panel 210 or end wall 150 may further include at least one bag handle hook 560 for retaining the handle of at least one grocery bag therein (not shown) to keep the bag closed during transit.

In use, with the wall extension means 140 in the open configuration 240 and positioned such that the lower edges 180 of each wall 150,160 thereof are in close proximity to the raised edges 60 of each half 40 of the case 30, and the case 30 being in its open position 110, the organizer 10 forms an open bin 260 for holding the cargo 20 (FIG. 6). Conversely, with the wall extension means 440 in the collapsed configuration 250 and stored in the case 30, the case 30 in the closed position 120, the organizer 10 is completely contained within the closed case 30, facilitating storage and transport thereof.

While a particular form of the invention has been illustrated and described, it will be apparent that various modifications can be made without departing from the spirit and scope of the invention. For example, the exact placement of the sound emitting means 20 may vary within the pocket formed by folding the secondary page 70. The tape 90 may alternately be a dab of glue. Accordingly, it is not intended that the invention be limited, except as by the appended claims.

What is claimed is:

1. An organizer for cargo comprising:
    a case comprising a pair of case halves, each half including a bottom wall having a plurality of upwardly extending side edges at a periphery thereof, one side edge of each half including a mutually-cooperating hinge means, an opposite side edge of each half including a mutually cooperating latch means, the case configurable into an open position in which the bottom walls of each case half are generally coplanar, and a closed position in which one case half is rotated about the hinge means substantially 180 degrees until the side edges of each case half are brought substantially into mutual contact to form a substantially sealed enclosure therebetween;
    a collapsible wall extension means comprising two end walls and two side walls, each wall including an upper edge, a lower edge, an inside surface, and an outside surface, each side wall including two side wall panels pivotally joined together at a side wall panel hinge means and including a case hinge cut-out for receiving the hinge means of each of the case halves therethrough, the collapsible wall extension means configurable into a generally square-in-plan-view open configuration and a generally flat, collapsed configuration;
    whereby with the wall extension means in the open configuration and positioned such that the lower edges of each wall thereof are in close proximity to the raised edges of each half of the case, the case in the open position, the organizer forms an open bin for holding the cargo and the case forms a water-tight tray, and with the wall extension means in the collapsed configuration and stored in the case, the case in the closed position, the organizer is completely contained within the closed case.

2. The organizer of claim 1 wherein each half of the case includes one half of a handle projecting from an outer surface of the opposite side edge thereof, each half of the handle forming the handle when the case is in the closed position.

3. The organizer of claim 1 wherein the latch means includes a lever and a catch, such that the catch of one half of the case is frictionally retained by the lever of the other half of the case, the lever being manually actuable to release the catch to allow opening of the case.

4. The organizer of claim 1 wherein each half of the case is structurally identical, whereby each half may be formed using the same mold.

5. The organizer of claim 1 wherein each half of the case further includes a pair of snap apertures traversing the side edges thereof proximate the hinge means of the one side edge, and a pair of snap pins, each snap pin including a flat rim larger in diameter than each aperture and attached to one end of a shaft, the shaft being smaller in diameter than each aperture, and a conical snap portion integral with an opposite end of the shaft, whereby each snap pin may be pressed through one aperture from outside of the case half to be retained by the rim and the conical snap portion thereof, the conical snap portions of each pin projecting into the case.

6. The organizer of claim 5 wherein each side wall panel includes a snap aperture adjacent to its case hinge cut-out such that when the wall extension means is in the open configuration and engaged with the case, each snap aperture of each side wall panel may be snapped onto one snap pin and retained thereby, such that the wall extension means is selectively and rigidly fixed to the case.

7. The organizer of claim 1 further including at least one resilient pole having two ends, the pole sized to fit between and be frictionally retained by either the two side walls or the two end walls of the wall extension means.

8. The organizer of claim 5 further including at least one telescopically extensible pole having two ends, the pole sized to fit between and be frictionally retained by either the two side walls or the two end walls of the wall extension means, at least one end of the pole being biased away from the other by a spring means.

9. The organizer of claim 8 wherein the end of each pole further includes an end aperture for receiving and being retained by the conical snap portion of each snap pin, whereby each pole may be engaged between snap pins of opposing side walls to strengthen the organizer when the case and wall extension means are in the open configuration, and for convenient storage of the poles within the case when the case is in the closed position.

10. The organizer of claim 8 wherein the inside surface of each wall of the wall extension means includes a plurality of pole receiving means, each pole receiving means for receiving one end of the pole, and each pole receiving means corresponding to one other pole receiving means on the opposing wall, such that with the pole engaged in each corresponding pole receiving means the pole is fixed in a substantially orthogonal orientation with respect to the one wall and the opposing wall, and fixed in a substantially parallel orientation with respect to the other walls and the bottom walls of each half of the case.

11. The organizer of claim 10 wherein each pole receiving means is one portion of one of a plurality of raised, sinusoidal ridges projecting inwardly from the inner surface of each wall, each sinusoidal ridge in opposite phase with adjacent sinusoidal ridges to form the pole receiving means, each sinusoidal ridge cooperating with corresponding sinusoidal ridges of an adjacent wall such that when the wall extension means is in the collapsed configuration the ridges intermesh with each other without making contact.

12. The organizer of claim 11 wherein the ridges are generally parallel with the upper and bottom edges of each wall.

13. The organizer of claim 10 wherein each pole receiving means is one portion of one of a plurality of raised, horizontal ridges projecting inwardly from the inner surface of each wall, each horizontal ridge further including a plurality of equally-spaced short vertical ridges intersecting the horizontal ridge to form the pole receiving means, each horizontal and vertical ridge cooperating with corresponding ridges of an adjacent wall such that when the wall extension means is in the collapsed configuration the ridges intermesh with each other without making contact.

14. The organizer of claim 13 wherein the horizontal ridges are generally parallel with the upper and lower edges of each wall.

15. The organizer of claim 1 wherein one side wall panel of each side wall of the wall extension means includes a panel locking means for locking each side wall panel in coplanar alignment.

16. The organizer of claim 15 wherein each panel locking means is a manually actuable lever adapted for pivotal attachment at one end thereof and for selective frictional engagement with the upper edge of a side panel at another end thereof.

17. The organizer of claim 15 wherein each lever further includes a snap means for holding the lever in an unlocked position.

18. The organizer of claim 9 wherein each side wall panel includes a pole retention means proximate to the lower edge thereof, whereby the pole may be retained in the pole retention means of two opposing side wall panels for convenient storage of the pole while the wall extension means is in the open configuration.

19. The organizer of claim 1 wherein the outside surface of each end wall of the wall extension means further includes at least one bag handle hook.

\* \* \* \* \*